Figure 1:
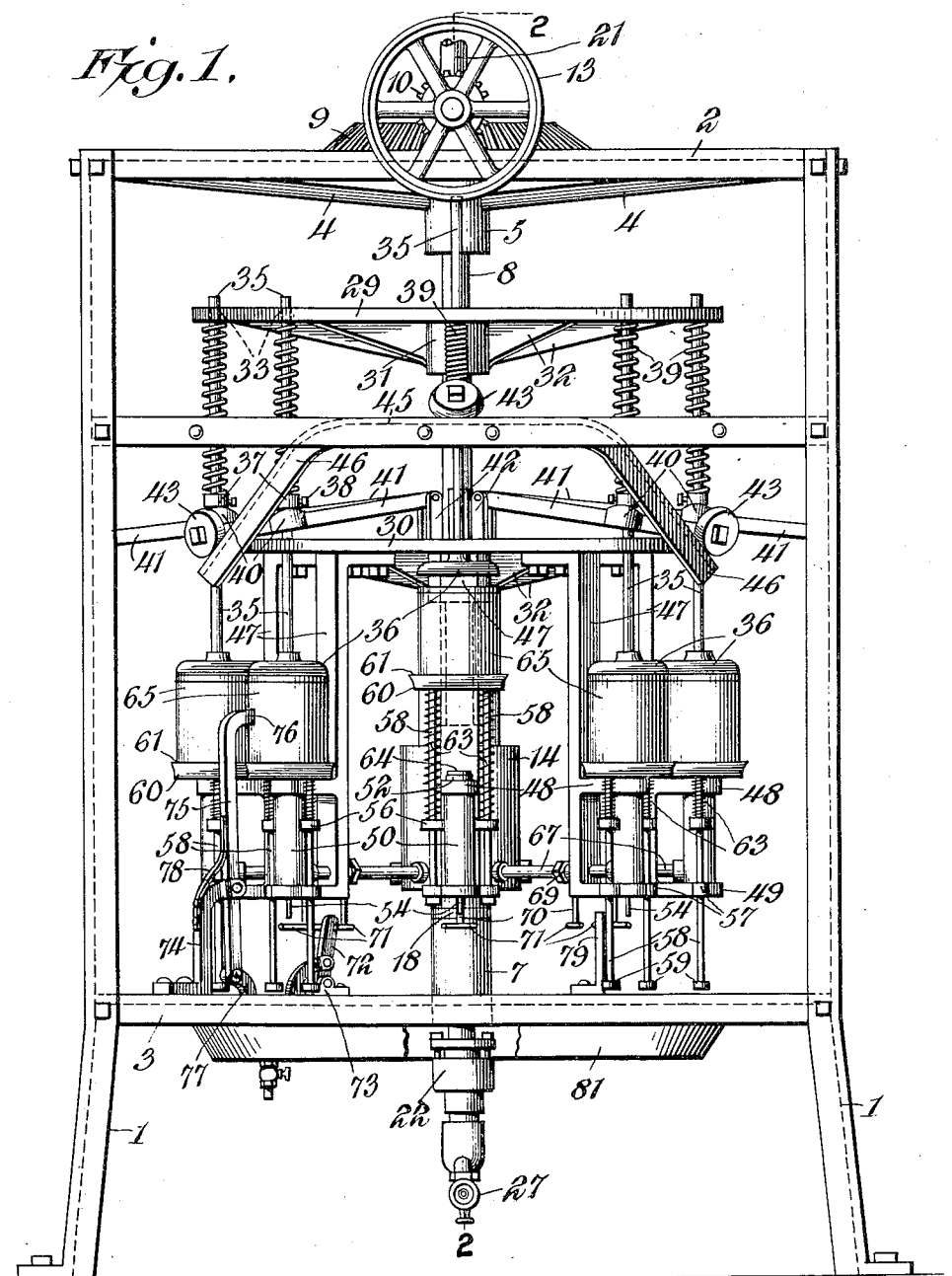

W. J. PHELPS.
CAN FILLING APPARATUS.
APPLICATION FILED JUNE 19, 1911.

1,058,094.

Patented Apr. 8, 1913.

7 SHEETS—SHEET 1.

Witnesses
Howard D. Orr.
F. T. Chapman.

Walter J. Phelps, Inventor,
By E. G. Siggers,
Attorney

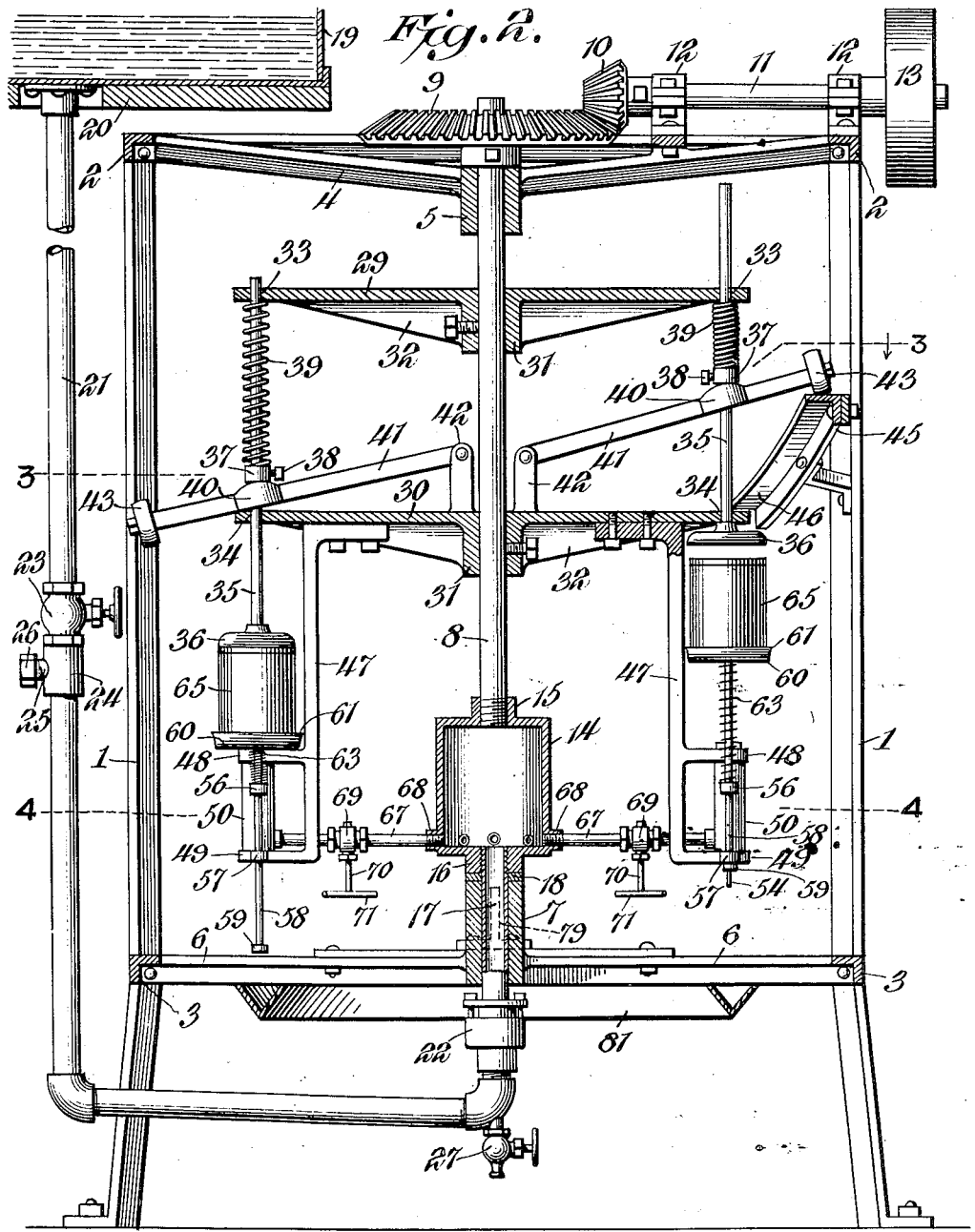

W. J. PHELPS.
CAN FILLING APPARATUS.
APPLICATION FILED JUNE 19, 1911.
1,058,094.
Patented Apr. 8, 1913.
7 SHEETS—SHEET 3.
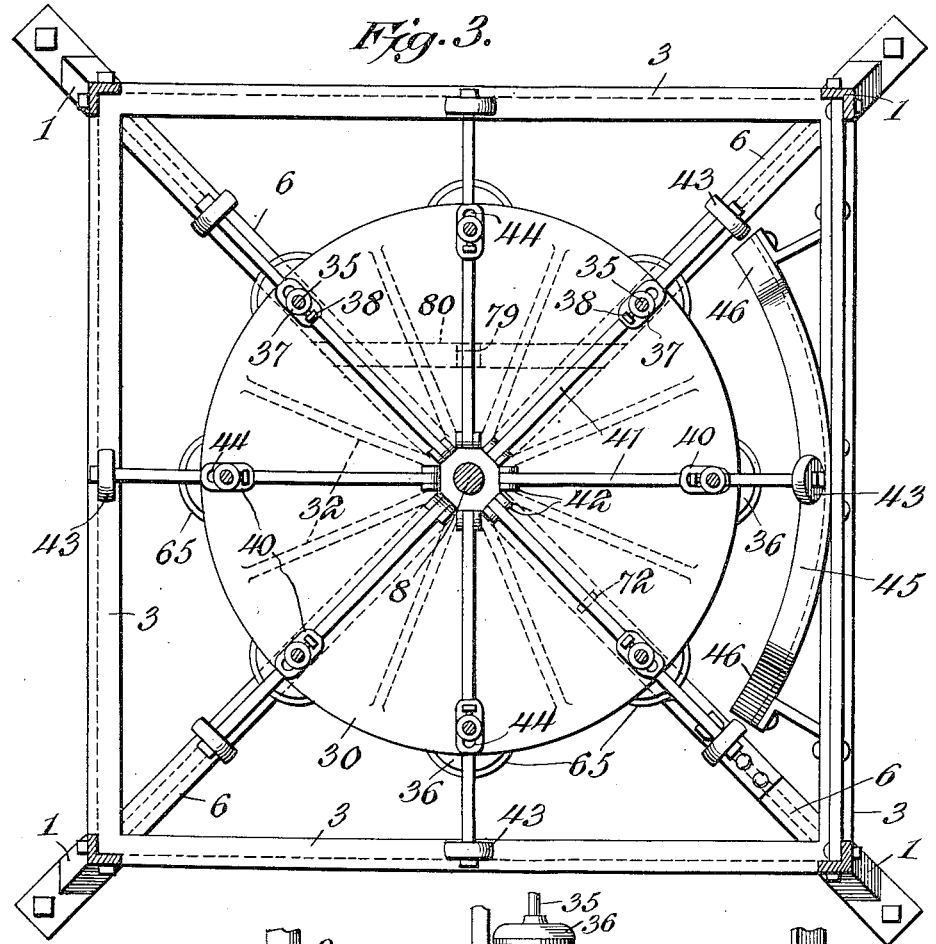
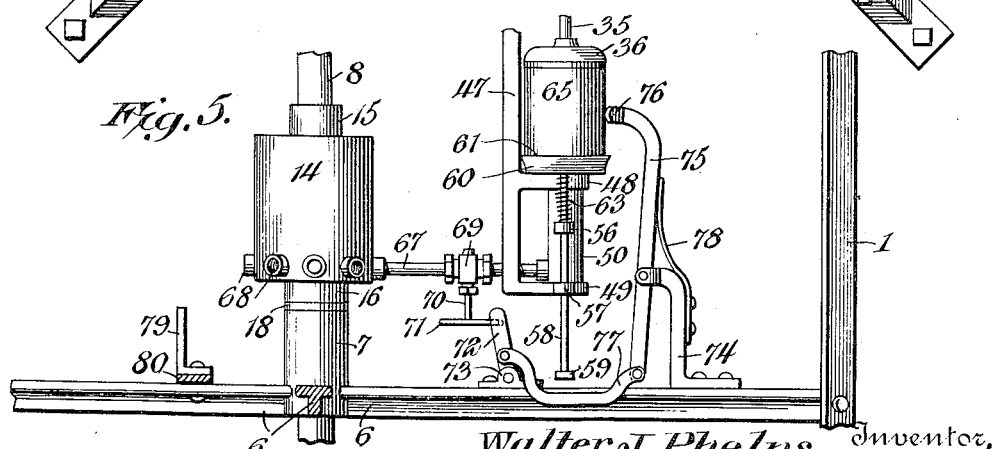
Witnesses
Howard D. Orr.
H. T. Chapman.
Walter J. Phelps, Inventor,
By E. G. Siggers,
Attorney W. J. PHELPS.
CAN FILLING APPARATUS.
APPLICATION FILED JUNE 19, 1911.
1,058,094.
Patented Apr. 8, 1913.
7 SHEETS—SHEET 4.
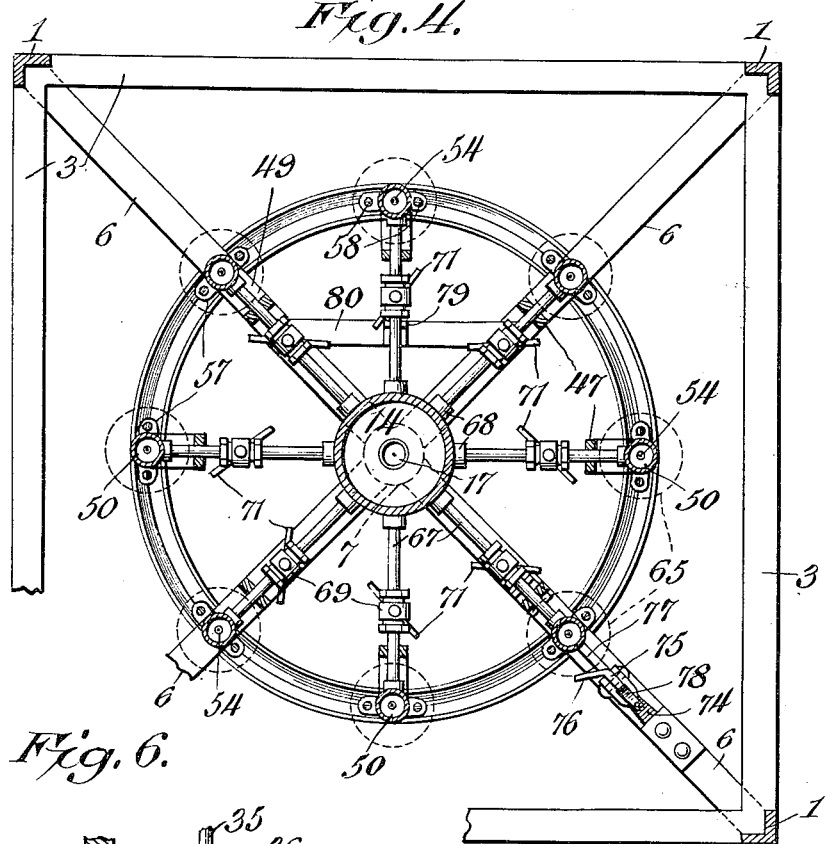
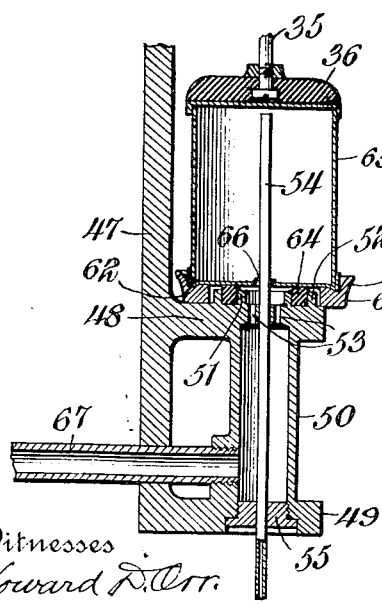
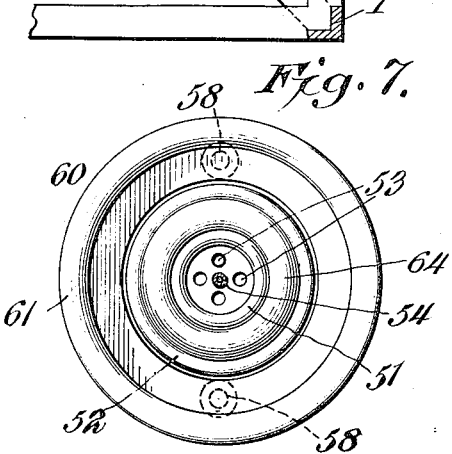
Walter J. Phelps, Inventor,
Witnesses
Howard D. Orr.
F. T. Chapman.
By E. G. Siggers
Attorney

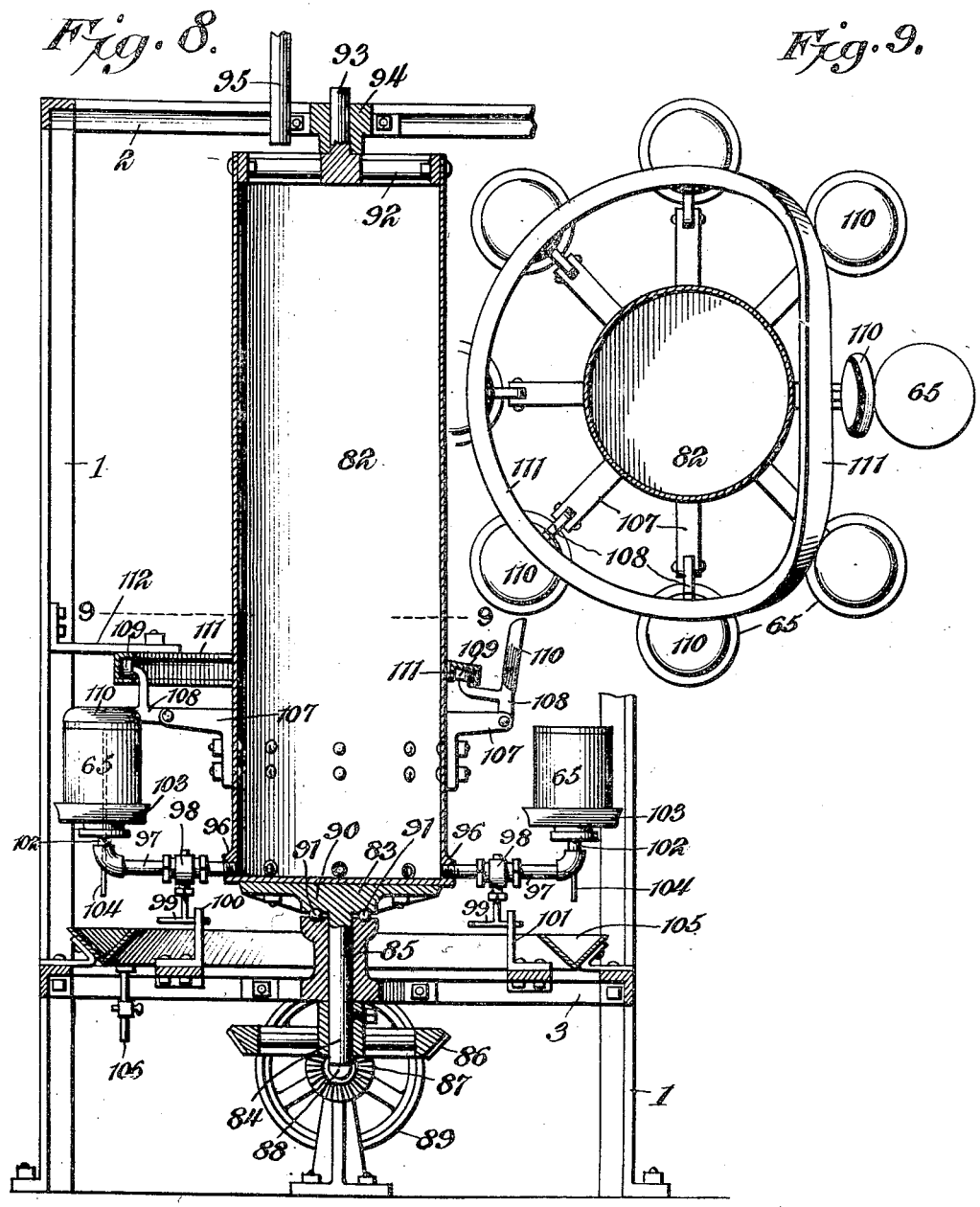

W. J. PHELPS.
CAN FILLING APPARATUS.
APPLICATION FILED JUNE 19, 1911.
1,058,094.
Patented Apr. 8, 1913.
7 SHEETS—SHEET 6.
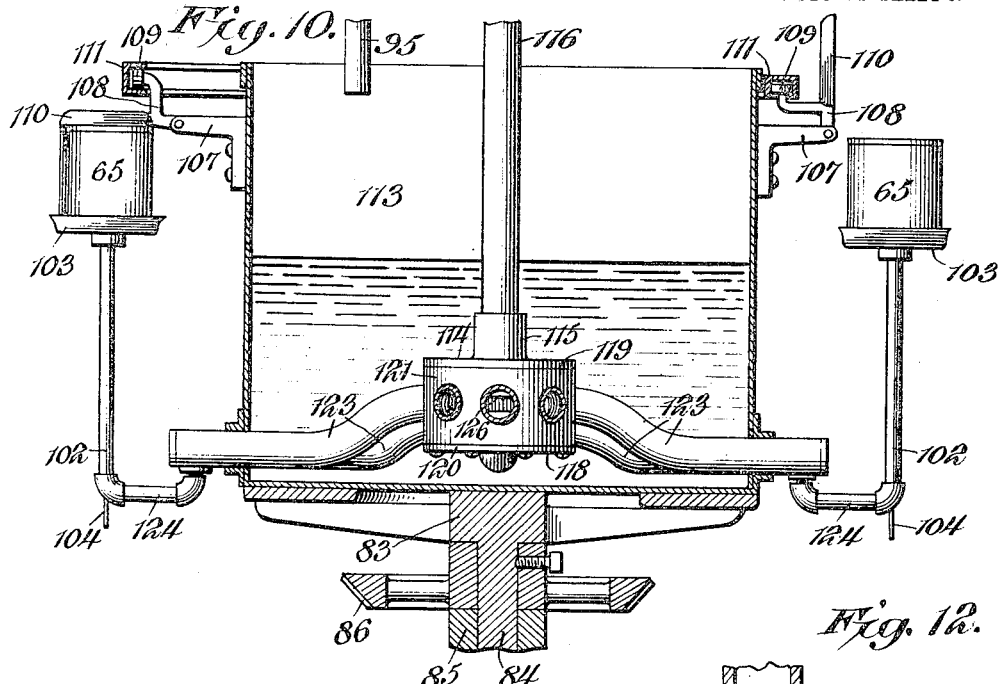
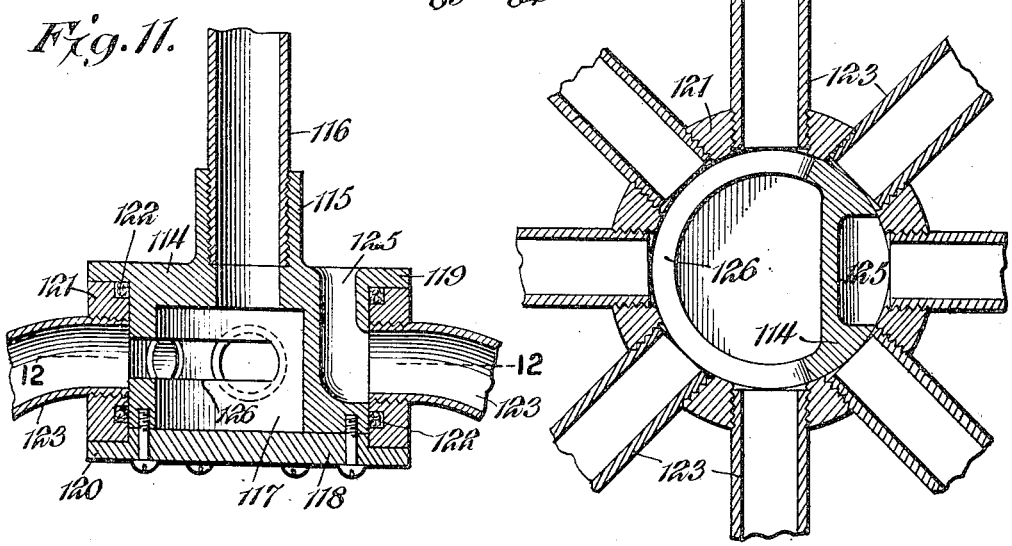
Witnesses
Howard D. Orr
F. T. Chapman
Walter J. Phelps, Inventor,
By E. G. Siggers
Attorney

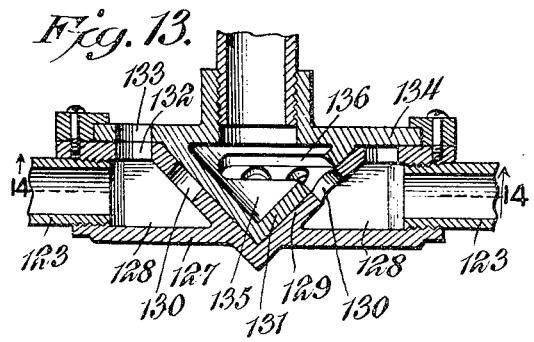
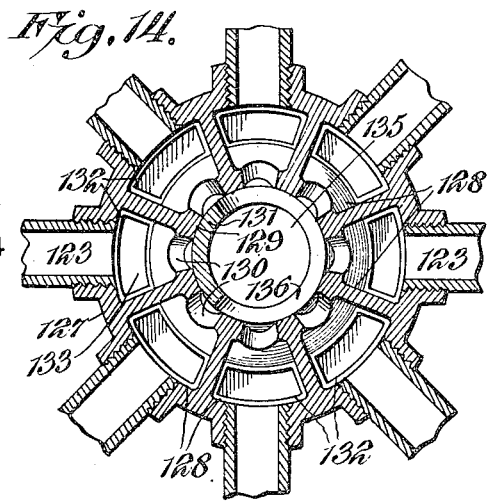
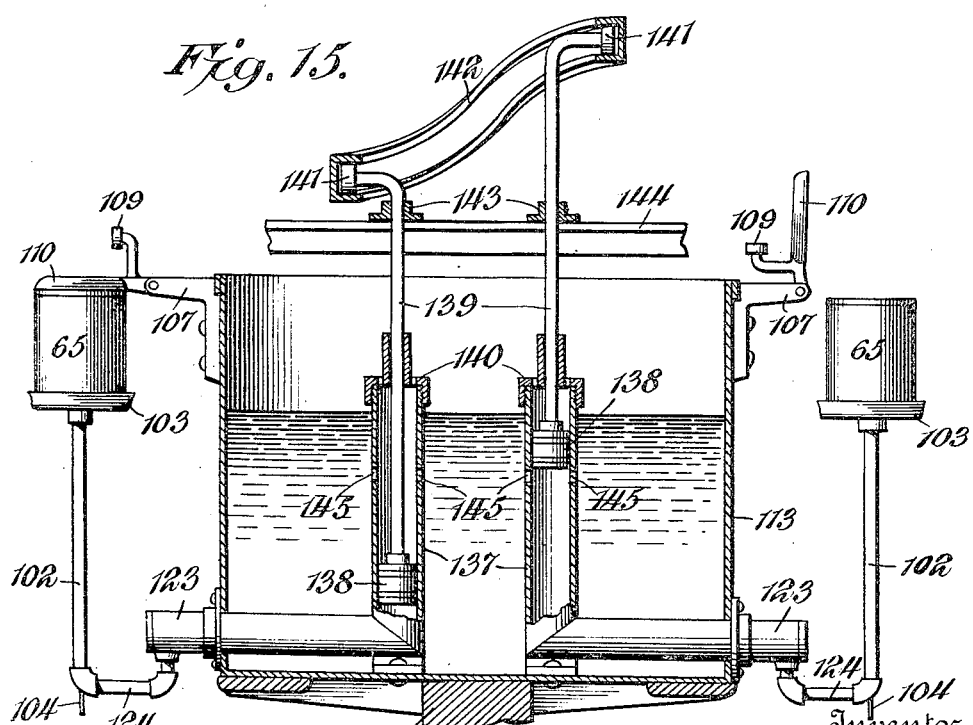

UNITED STATES PATENT OFFICE.

WALTER J. PHELPS, OF BALTIMORE, MARYLAND, ASSIGNOR OF ONE-HALF TO FRANK GEBBIE, OF ROCHESTER, NEW YORK.

CAN-FILLING APPARATUS.

1,058,094.   Specification of Letters Patent.   Patented Apr. 8, 1913.

Application filed June 19, 1911.   Serial No. 634,052.

*To all whom it may concern:*

Be it known that I, WALTER J. PHELPS, a citizen of the United States, residing at Baltimore, State of Maryland, have invented a new and useful Can-Filling Apparatus, of which the following is a specification.

This invention has reference to improvements in can filling apparatus, and its object is to provide an apparatus for the filling of cans with liquid material through a single small filling perforation in one end of each can, and while the apparatus is adapted to the filling of cans with various liquids, it is especially adapted to the filling of cans with milk in the form known as evaporated milk, and for simplicity of expression in the following description the liquid to be filled into the cans is considered as evaporated milk, and will be simply designated as milk, with the understanding, however, that the usefulness of the invention is not limited thereby to the filling of cans with milk.

In the canning of milk it is of great advantage to have the cans completed with the exception of a small filling perforation through one of the heads or ends of the can before any of the milk is introduced thereinto, and in order that the final closure or sealing of the can may be expeditiously and economically performed, it is of great advantage to have the perforation of such small size that it may be closed by a single small drop of solder. The smaller the perforation, which in practice is made by simply forcing a small pointed tool through the center of the head of the can, the smaller the drop of solder needed to close the perforation, and the less the liability of any of the solder dropping into the can during the soldering operation, and it is found in practice that the small perforation may be made of such minute size that the solder will not drop through and enter the can as a loose globule. Such a small opening in a can necessitates the employment of a small stream of milk, which, in order that the can may be expeditiously filled, must be forced into the can under considerable pressure, and by the methods heretofore employed there is a liability of causing a foaming of the milk if it be attempted to force the stream even with comparatively moderate pressure, wherefore in continuously operating machines the apparatus must be of large size in order that the cans may be fed to and removed from the machine as rapidly as an operator can handle them, for in order to fill a can a considerable time must elapse during which the filling operation is progressing, in order that the liability of foaming may be avoided, evaporated milk being particularly susceptible to the condition known as foaming. With the present invention, however, the liability of foaming is obviated even though the pressure be carried far beyond the point which would always cause foaming in the filling apparatus as heretofore employed, and consequently a machine of the same output as those heretofore employed may be very materially reduced in size with a consequent reduction in first cost and up-keep.

In accordance with the present invention the cans are placed in the machine in an inverted position, that is, with the end containing the small filling perforation downward and the imperforate end upward, the expressions of position being with relation to the machine as operatively installed. The milk is directed to the exterior of the can immediately adjacent the small perforation, any spread of the milk over the exterior of the can other than in the immediate vicinity of the perforation being prevented by suitable means, such as rubber or like packing or gaskets, and the air contained in the can is caused to flow out of the can through the same perforation, but by way of a conduit of minute diameter, which is so related to the perforation as to leave ample room for the inflow of milk, the air escaping freely through such a small conduit, and the latter is of sufficient length to enter the can to a point as near the imperforate end of the can, which end is in the filling operation uppermost, as the ultimate desired level of the milk in the can may determine.

In a companion case Serial No. 634,051 filed by me on June 19, 1911 for a can filling machine, there is shown and described an apparatus for the same purpose as the apparatus of the present invention, and where the milk is filled into the can with the latter in the inverted position through a small filling perforation in one head of the can. In the said application of even date herewith the inflow of milk is caused by the direct action of atmospheric pressure, the air within the can being withdrawn from the upper or closed end through a suction conduit of minute diameter extending through the filling perforation, whereby sub-atmospheric pressure is produced within the can, and the milk is caused to flow into the can by the difference between the sub-atmospheric pressure produced within the can and the normal atmospheric pressure exerted on the surface of the milk directed to the can. In the present invention super-atmospheric pressure is employed and the air is forced out of the can by the superior pressure exerted upon the milk directed to the can. In both cases the milk enters the can through what is then the bottom of the can, since the can during the filling operation is in an inverted position, the filling orifice or perforation being then lowermost. As soon as a thin layer of milk accumulates on the interior of the head of the can, then downward, the milk no longer enters the can in the form of a jet or stream, but is caused to spread out toward the sides of the can by the resistance of the milk already in the can, this condition arising very quickly after the filling operation begins, so that even though quite a heavy pressure be exerted upon the milk to force it into the can, the milk will not enter the can in the form of a jet or long stream which because of its length and ultimate engagement with the milk accumulating in the can would cause foaming of the milk. This undesirable condition known as foaming is entirely obviated by driving the incoming milk into the body of milk at the initial point of entrance into the can, wherefore the entering milk does not engage the accumulated milk in the form of a jet or stream first traversing a considerable air space, but the incoming stream is at once diverted toward the sides of the can, losing its momentum and readily coalescing with the accumulated milk. The pressure which may be employed is much greater than is possible where the milk enters the can from the top, and the filling of the can is correspondingly expedited, with the result, as already stated, that the machine may be much condensed in size without sacrifice of output.

The invention will be best understood from a consideration of the following detailed description, taken in connection with the accompanying drawings forming a part of this specification, with the understanding that while the drawings illustrate several practical embodiments of the invention, these examples by no means exhaust the practical embodiments of the invention, and therefore, the invention is not limited to the exact showing of the drawings, but is susceptible of various changes and modifications, all of which will come within the scope of the invention.

In the drawings:—Figure 1 is an elevation of a practical embodiment of the invention, wherein the super-atmospheric pressure is due to the action of the force of gravity. Fig. 2 is a section on the line 2—2 of Fig. 1, with some parts shown in elevation. Fig. 3 is a section on the line 3—3 of Fig. 2. Fig. 4 is a section on the line 4—4 of Fig. 2. Fig. 5 is a detail elevation with some parts in section and some parts broken away, showing a trip mechanism for insuring proper operation of the machine. Fig. 6 is a detail section through one of the can supports with a can in place. Fig. 7 is a plan view of one of the can supports with the air tube in cross section, the said figure being drawn to a larger scale than Fig. 6. Fig. 8 is a central vertical section through a somewhat modified form of a gravity feed machine of the type shown in Fig. 1. Fig. 9 is a section on the line 9—9 of Fig. 8. Fig. 10 is a diametric section with some parts in elevation of a portion of a can filling apparatus in part similar to the structure shown in Fig. 8 but illustrating a form of the invention wherein super-atmospheric air pressure is employed to force the milk into the cans. Fig. 11 is a section in the same plane as Fig. 10, but taken through the distributing valve only and drawn to a larger scale than Fig. 10. Fig. 12 is a section on the line 12—12 of Fig. 11. Fig. 13 is a section similar to Fig. 11 but showing a different form of distributing valve. Fig. 14 is a section on the line 14—14 of Fig. 13. Fig. 15 is a section similar to Fig. 10 of a portion of a can filling machine wherein mechanical pressure is applied to the milk to force it into the cans.

Referring first to the structure illustrated in Figs. 1 to 7, both inclusive, there is shown a main frame which in the particular indication of the drawings comprises legs 1, top connecting bars 2, bottom connecting bars 3, and intermediate connecting bars 4, these bars being disposed to outline generally a rectangular figure, and the whole frame may be made of structural steel, usually angle bars. At the upper end of the frame there is secured a spider 4 having a central hub 5, and at the bottom portion of the frame coincident with the side members 3 is a spider having arms 6 terminating at a central hub 7. The two hubs 5 and 7 serve as bearings for a shaft 8, which in the particular showing of the drawings is an upright shaft, considering the machine as in operative position. At the upper end the shaft 8 carries a bevel gear 9, with which meshes a bevel pinion 10 fast on one end of a shaft 11 having journal bearings 12 supported at the upper end of the frame and at the end of the shaft 11 remote from the pinion 10 is a pulley 13 for the application of power by a belt, but which may be taken as typical of any means for the application of power to the machine.

The shaft 8 is not continuous between the two bearings 5 and 7, but its continuity is broken by a chamber 14 of general cylindrical shape having at one end a boss 15 threaded for the reception of the corresponding end of the shaft 8, which latter is threaded for the purpose, and the portion of the shaft 8 carrying the gear wheel 9 at one end and the chamber 14 at the other end may be solid. The chamber 14 at the end remote from that entered by the shaft 8 is formed with an axial boss 16 having an axial hollow continuation 17 either in the form of a pipe made fast to the boss 16 or otherwise formed to constitute a continuation of the shaft 8, being in axial alinement therewith. Between the hub 7 and the boss 16 there is interposed a washer 18, so that the hub 7 and washer 18 constitute a supporting bearing for the shaft 8 with the chamber or cylinder 14 attached thereto, while the pipe or hollow continuation 17 serves to centralize the shaft with relation to the hub 7, and also serves another purpose, which will presently appear. The chamber or cylinder 14 with the hollow continuation 17 participates in the rotary motion of the shaft 8 imparted thereto by the gearing 9, 10 driven by the shaft 11 and pulley 13.

At an appropriate point there is located a reservoir 19 in which there is maintained a suitable supply of milk, and this reservoir is supported at an appropriate height to give a head to the milk flowing therefrom sufficient to establish the desired pressure. The reservoir 19 may be mounted on a suitable platform 20, which in turn may be supported in any appropriate manner, and from the bottom of the reservoir there leads a pipe 21 ultimately connected to the pipe or shaft continuation 17 through a swivel union 22, so that the pipe 17 may turn with the shaft 8 and still maintain communication with the pipe 21, which latter is stationary. In the pipe 21 there is provided a valve 23 for stopping or controlling the flow of milk through the pipe, and the pipe also is provided with a T coupling 24, having a threaded branch 25 normally closed by a cap 26. At the lowest point the pipe 21 is provided with a drain valve 27.

The solid portion of the shaft 8 has attached thereto at spaced points disks 29, 30, respectively, each provided with a central hub 31 and with radial strengthening webs 32, and it will be understood that the disks 29 and 30 may be either solid, as indicated, or of skeleton form, since the functions of the disk are the same in either case. The disk 29 near the periphery is formed with a circular series of passages 33, the purpose of which will presently appear. The disk 30 is formed with a like circular series of passages 34, the passages 33 and 34 being in line one with the other and located near the peripheries of the respective disks.

Extending through matching passages 33 and 34 are rods 35 each terminating at one end, this being the lower end in the installed machine, in a head 36 constituting a clamping head for a purpose which will presently appear. Between the two disks 29 and 30 each rod 35 has applied thereto a collar 37 held in place by a set screw 38, and between this collar and the disk 29 each rod is surrounded by a spring 39 tending to move the rod downwardly, but yielding to a superior force tending to move the rod upwardly. Each rod extends through an enlargement 40 formed on a bar 41 between the ends thereof, there being as many bars 41 as there are rods 35. In the upper face of the disk 30 is a circular series of ears 42 close to the shaft 8 and pivoted in each pair of ears in the corresponding end of a bar 41, the other end of each bar beyond the enlargement 40 carrying a roller 43. Each bar 41 at the enlargement 40 is provided with an elongated slot 44, through which the rod 35 passes, so that the roller end of the bar may move up and down about its pivot support in the ears 42, the action of the bar being that of a lever engaging the collar 37 and through the same raising the corresponding rod 35 against the tendency of the spring 39 when an appropriate lifting force is applied to the roller 43, and this movement is brought about by a cam track 45 made fast to the main frame at an appropriate point, the cam track having an intermediate level portion with depending curved ends 46. The arms or levers 41 participate in the rotative movement of the shaft 8 and the rollers 43 are brought in succession into engagement with the cam track 45, thus causing a rocking of the levers, the movement being first a lifting movement until the level portion of the cam track is reached, when the lifting movement ceases, but the lever is maintained in the elevated position until the depending end 46 at the other end of the track is reached, when the spring 39 being released to action, will cause downward movement of the respective arm or lever 41 and clamp head 36, all for a purpose to be presently described.

Fast to the under side of the disk 30 are hangers 47 extending downward to a point about as low as the bottom of the chamber or cylinder 14, and each hanger is formed near the lower end with two outstanding spaced arms 48 and 49, respectively, which in the installed machine are approximately horizontal and are parallel one with the other. Near the ends of the arms 48 and 49 they are joined by a tubular portion 50 which may be formed in one piece with the arms 48 and 49, and the latter in one piece with the hanger 47 when desired. The upper face of the arm 46 has thereon concentric upstanding flanges 51 and 52, and within the space defined by the flange 51 the arm 48 is pierced by a circular series of passages 53 extending to the interior of the tubular member 50 and there is also central to this circular series of passages another passage through which extends a tube 54. The interior of the tubular member 50 remote from the arm 48 opens through the arm 49 and there receives a screw plug 55 through the center of which the tube 54 extends and below which at an appropriate distance this tube 54 may terminate, the said tube being freely open at both ends.

Formed on and outstanding from opposite sides of the tubular member 50 are lugs 56 and outstanding from corresponding sides of the arm 49 there are lugs 57. These lugs are provided with passages for rods 58, one on each side of the arms 48 and 49, each rod 58 having at one end, this being the lower end, a head 59, while at the other end the two rods carry a ring 60 best shown in Figs. 6 and 7. The ring 60 is formed with a marginal upstanding and outstanding flange 61 adjacent which is an annular depression 62, although under some circumstances such depression may be omitted. Each rod 58 between the respective lug 56 and the ring 60 is surrounded by a spring 63 tending to lift the ring 60 with the rods until the lifting movement is arrested by the engagement of the heads 59 with the lugs 57. The springs 63 will, however, readily yield to a sufficient force tending to move the ring 60 until it ultimately engages the upper face of the arm 48 outside the flange 52 between which latter and the flange 51 there is lodged a ring or gasket 64 of soft rubber or other suitable material for a purpose which will presently appear.

The ring 60 is designed to receive one end of a can 65, which is to have milk filled thereinto. The cans 65 are of appropriate size and may be such as are commonly used for the reception of evaporated milk, these cans being finished before filling with the exception of a small central perforation 66 in one head, this perforation being customarily made by a pointed tool forced through the metal so as to cause the perforation without cutting out any of the metal, but simply breaking through and displacing the metal, so that about the perforation there is a slight depression in the outer face of the head of the can. It is also customary to form the perforated head of the can with a slight marginal flange which will readily seat in the annular depression 62, thus aiding in the centering of the can on the ring 60.

The perforation 66 is a small perforation and is made as small as practicable, so that it may be readily sealed by a small drop of solder without danger of the melted solder passing through the perforation and dropping into the can in the form of a globule. When the perforation is sufficiently small, the surface tension of the melted solder and the capillary attraction of the walls of the perforation for the solder will hold the latter to the walls of the perforation until solidification takes place and the solder is properly united to the can top.

It is necessary that the perforation be large enough to admit the milk into the can and at the same time permit the escape of air from the can as the milk enters it. The tube 54 is provided for the escape of air from the interior of the can and this pipe is made so small in external diameter as to pass freely through the perforation 66 and leave sufficient space about it at the perforation to permit the inflow of milk. In practice the inner diameter of the tube 54 need not exceed one-thirty-second of an inch, for the bore of such a tube will permit the escape of air with sufficient rapidity under the pressure employed. In the drawings, however, the tube 54 and the perforation 66 are both shown disproportionately large for the purpose of clearness of illustration.

The tubular member 50 is entered by a pipe 67 which may be passed through the hanger 47 and is carried to an appropriate one of a series of hollow nipples 68 formed in the walls of the cylinder or chamber 14 near the bottom thereof and the pipes 67 may be arranged in substantially radial relation to the axis of rotation of the rotatable portion of the machine. Each pipe 67 contains a valve 69 having a valve stem 70 terminating in a cross arm 71, which in the particular showing of the drawings is so arranged as to be below the respective valve 69.

Mounted on one of the arms 6 is a finger 72 upstanding from a pivot support 73, so that the upper end of the finger may be moved to and fro. Fast to the same arm 6 is an upstanding bracket 74 at some distance from the pivot support 73, and this bracket 74 constitutes an intermediate pivot support for a lever 75, which in operation stands approximately upright, and has its upper end bent at an angle as indicated at 76, while the lower end of the lever is connected by a link 77 to the finger 72 at one side of the pivot support of the latter, the link 76 being appropriately bent to drop below the path of the heads 59 when in their lowermost position. The lever 75 is urged in one direction by a spring 78, which may be carried by the bracket 74 or may be disposed in any manner which will give to the end 76 of the lever 75 a normal tendency toward the axis of rotation of the rotary parts of the machine. Such movement of the lever 75 is sufficient to withdraw the finger 72 from the path of the cross arms 71 of the valves 69, while the reverse movement of the lever will move the finger 72 into the path of such cross arms. At another point in the path of the cross arms 71 is a fixed stop member 79, which may be mounted on a cross piece 80 fast to two of the arms 6.

Let it be assumed that there is a supply of milk in the reservoir 19, and that the valve 23 is opened, and, also, that appropriate ones of the valves 69 are opened, and that cans 65 are seated on the rings 60 in inverted position, that is with the heads provided with the perforations 66 in engagement with the rings 60 and that the clamp heads 36 are in their lowermost position in engagement with the imperforate, or then upper ends of the cans, holding the latter firmly in engagement with the rings 60, the springs 63 being under these conditions compressed, and the perforated heads of the cans being engaged by the rings or gaskets 64 seated between the flanges 51 and 52, so that an air and milk tight joint is established between each ring 64 and the corresponding head of the can. Under these circumstances milk will gravitate from the reservoir 19 through the pipe 21 to the interior of the chamber 14, and will thence be distributed through the pipes 67, having the valves 69 open, to the tubular members 50, thence through the passages 53 into the spaces inclosed by the flanges 51 and gaskets 64 and thence through the perforations 66 in the then lower head of the inverted cans into the interior of the cans, the air within the cans finding ready escape through the tubes 54 which are of a length to extend quite close to the imperforate upper end of the can, these tubes, as before stated, being freely open at the lower ends, but having no communication at all with the milk ducts. The can carrier may be rotated at an appropriate speed by the gearing 9, 10, this rotation being permitted by the swivel union 22, which will admit of the pipe 17 rotating about its longitudinal axis without leakage at the union. The milk will flow into the chamber 14, and from thence through those cans communicating with the chamber under a pressure equal to the head due to the elevation of the reservoir. The milk enters the can from what is then the bottom thereof, since the can is inverted, and passes through the small perforation 66 into the interior of the can, the tube 54 being so small as not to materially interfere with the entrance of the milk into the can, even though the perforation 66 be of so small a size as to permit the closing of the opening by a small drop of solder without danger of the melted solder passing in the form of a free globule into the interior of the can.

The milk on first entering the can may pass thereinto in the form of a jet, but such jet is very quickly suppressed by the accumulated milk within the can, for as soon as the thin layer of milk is established in the bottom of the can, the jet can no longer penetrate it, but is caused to spread out toward the sides of the can without, however, impeding its rapid movement into the can, but this spreading out of the jet into coalescing relation to the accumulated milk absolutely prevents any foaming of the milk even though the pressure driving the milk into the can may be materially in excess of the pressure permissible where the milk is introduced into the can in the form of a jet or fine stream, striking the accumulated milk at some little distance from the point of entrance into the can.

As the milk is forced into the can, the air within the can flows out through the tube 54 until ultimately the level of the milk reaches the upper end of the tube, when it will flow thereinto. It is, of course, necessary that any milk which passes into the tube 54 and escapes from the end thereof open to the atmosphere drop into a suitable receptacle, and for this purpose there is provided a circular trough 81 which may be supported by the arms 6 below the lower ends of the tubes 54, so that any overflow of milk escaping from these tubes will drop into the trough 81, and from this trough the milk may be conveyed to any suitable point of disposal.

The parts are so timed in operation that some milk will escape from the tubes 54 before the point in the cycle of operations where the empty cans are placed in the machine and the filled ones removed therefrom is reached. The dripping from the tubes 54 is an indication to the operator that the particular cans have been filled to the full capacity, and that the machine is running at the proper speed. This becomes important, for different batches of evaporated milk may vary as to density and weather and other conditions may affect the flow of the milk. At the same time, there is no need of any milk being lost, since the trough 81 will catch the overflow, which may be thereby saved. As soon as the milk level reaches the top of a tube 54, the outflow of air through the tube is arrested, and since the much more dense milk will not flow as readily through the tube 54 as does the air, there is some compression of air within the can, which, after the flow of milk through the can is arrested, will cause the level of milk in the can to be lowered by forcing the milk through the tube 54 until the proper level is reached, which level is determined by the extent of insertion of the tube into the can. Usually a space of about one-quarter of an inch, more or less, between the upper end of the tube and the imperforate end of the can is ample.

Assuming that the machine is running at the proper speed, and that the filling is progressing properly, the can becomes full of milk before the finger or stop 79 is reached, and when such stop 79 is reached the cross piece 71 of the valve 69 is engaged by this stop, so that the progressive movement of the rotatable parts causes the valve to be turned to the cut off position, thus stopping further flow of milk, but the position where the full can is to be removed has not yet been reached. A further rotative movement of the rotatable parts brings the roller 43 of the arm 41 controlling the clamp head 36 of the particular can under consideration into engagement with the depending portion 46 of the cam track 45, and the roller is thereupon caused to travel up this depending portion, raising the outer end of the arm 41 and with it the rod 35 and clamp head 36, the ring 60 following this movement because of the expansive action of the springs 63 until further upward movement of the ring 60 is arrested by the engagement of the heads 59 with the lugs 57, but the clamp head 36 is raised sufficiently to release the can, so that it may be lifted from the ring 60, the upward movement of the ring being such as to carry the can above the upper end of the tube 54. There is no escape of milk from the perforation 66, although the can is in the inverted position, because of the surface tension of the milk and atmospheric pressure bearing upon the same. While the roller 43 is traveling along the level elevated portion of the cam track 45, sufficient time is provided for the operator to remove the full can and place an empty can in the inverted position upon the ring 60, the flange 61 and groove 62 centering the can. A further rotative movement of the rotatable parts brings the roller 43 of the arm 41 under consideration to the other end of the track 45, so that the roller 43 rides down the depending portion 46 of the track at the corresponding end. The expansion of the spring 39 first brings the clamp head 36 into engagement with the imperforate, or then upper end of the can, and a further expansive movement of the spring 39 forces the can and the ring 60 toward the arm 48, and this movement continues until ultimately the ring 60 is seated on the arm 48 with the inverted can in engagement with the gasket 64 and the tube 54 within the can with its upper open end close to the inner face of the imperforate end of the can. Up to this point no milk can reach the can because the valve 69 in the pipe 67 communicating with the can under consideration is closed. Now, the can engages the end 76 of the lever 75 and the parts are so proportioned that the lever 75 is rocked against the action of the spring 78 to an extent to move the finger 72 into the path of the oncoming cross piece 71 of the valve 69 under consideration, and this cross piece being engaged by the finger 72 will be moved sufficiently to open the valve before escaping from the cross piece, thus putting the can into communication with the milk supply and filling at once begins and proceeds as already described. In the meantime the spring 78 returns the lever 75 to its normal position ready to be engaged by the next can in order. Suppose, however, that for some reason the operator fails to place an empty can upon the appropriate ring 60, it then follows that the lever 75 is not rocked against the action of the spring 78 and the finger is not brought into the path of the cross piece 71, so that the particular valve remains closed and no milk can flow through the particular pipe 67 to escape upon the machine.

It becomes advisable to cleanse and sterilize the machine from time to time, and for this purpose the valve 23 may be closed, the valve 27 may be open to drain the chamber 14 and parts connected therewith, and the cap 26 may be removed, whereby all parts below the valve 23 are drained of contained milk. Now, a steam conduit, such as a steam hose, may be connected to the nipple 25 and steam be freely driven through all the parts traversed by milk, thereby thoroughly cleansing all these parts and effectually sterilizing them, the steam being used under a suitable pressure to force it through the parts and also to establish the desired temperature.

Since the ring 60 is ultimately seated against the comparatively solid arm 48, it is advisable that the clamping head 36 be made more or less elastic, and for this purpose it may be made of rubber or other suitable material, or may be suitably constructed to yield to some extent, although the elasticity of the spring 39 may be so proportioned as to accomplish the same purpose.

While the structure described with reference to Figs. 1 to 7 is advantageous in being quite flexible as to the pressure which may be readily established by the simple expedient of elongating or shortening the pipe 21 to vary the head of the milk, the pressure may be caused in other ways than by gravity or other means for establishing pressure by gravity may be employed. One such means for causing the pressure of the milk by gravity is illustrated in Figs. 8 and 9. In these figures there is provided a frame having legs 1 and upper and lower frame members 2 and 3, respectively, and there is provided an elongated reservoir 82 which may be in the form of a cylinder extended axially and of comparatively small diameter, this cylinder being closed at one end and usually fast to a supporting plate 83 provided with an axial stem 84 extending through a hub 85 supported by the frame 3. The reservoir 82 is upright when the machine is installed in operative position, and the stem 84 extends below the hub 85, where it carries a bevel gear 86 in mesh with a bevel pinion 87 mounted on a shaft 88, which in turn carries a pulley 89 for the application of power, so that rotative movement may be imparted to the reservoir 82 through the gearing and the stem 84, the plate 83 being provided with a central boss 90 supported by the hub 85 through the intermediary of anti-friction bearings 91 of any appropriate type. The upper end of the reservoir 82 is open and has fast thereto a spider 92 provided with an axial stem 93 journaled in a hub 94 carried by the frame member 2. Milk may be delivered into the reservoir through a pipe 95 from a suitable source of supply, and it is customary to provide the pipe 95 with suitable controlling means, although such means are not shown. At the lower end of the reservoir there is provided a circular series of outstanding bosses 96 each having a threaded passage leading to the interior of the reservoir, and in each passage is a pipe 97 including a valve 98, provided with a T stem 99 in the path of which stem at appropriate points are stop members 100 and 101, respectively, so disposed as to engage the T stems of the valves and move the valves to the open and shut position alternately at suitable intervals. The pipes 97 terminate in upstanding portions 102 each carrying a can support 103, to which may be applied a can 65 in the inverted position, the same as in the structure of Figs. 1 to 7. In this form of the invention there is also provided an air tube 104 extending through the pipe extension 102 and through the support 103 and to a sufficient distance above the same to enter the can resting in an inverted position on the support 103 to a sufficient distance to reach nearly to the inner wall of the imperforate end of the can, which end is then uppermost. Underlying the lower ends of the pipes 104 is a drip trough 105 provided with a valved drain pipe 106 and operating the same is the drip trough 81 of the first form described. The reservoir 82 carries an exterior circular series of brackets 107, to each of which is pivoted an angle lever 108 having on one arm a roller 109, and on the short arm a clamp member 110, the latter being for the purpose of engaging the upper end of a can and holding it in firm relation to the can support 103, which support may be provided with a sealing gasket like the gasket 64 shown in Figs. 6 and 7. The rollers 109 on the respective arms of the levers 108 travel in a channel cam strip 111, which may be supported by the legs 101 from brackets 112 fast to said legs, and this cam strip is so shaped that the levers 108 are rocked on their pivots to an extent to lift the clamp members 110 out of the path of the cans during a portion of the rotation of the reservoir and cans therewith, and during another portion of the rotative movement to engage the cans and hold them firmly to their seats.

The operation of the structure shown in Figs. 8 and 9 is substantially that of the structure shown in Figs. 1 to 7 and needs no special description, the principal difference being that the reservoir 82 is of sufficient height to provide the necessary pressure to force the milk into the cans, the level of the milk within the reservoir determining the degree of pressure.

Where compactness, especially as to the height of the machine, is desirable, other means where the force of gravity is not utilized may be employed. In the structure shown in Figs. 10, 11 and 12 pneumatic super-atmospheric pressure is utilized. In this case there is provided a reservoir 113, which in structure may be quite similar to the reservoir 82, except that its height may vary much less since the action of the force of gravity is in this case not material, and it is actually unnecessary that the level of the milk in the reservoir be at all above the can supports, for the pressure utilizable will force the milk to any desired height. All the parts which in Figs. 10, 11 and 12 are the same as illustrated in Figs. 8 and 9 are designated by the same reference numerals, and need no further description. Within the reservoir 113 so as to be immersed in the milk contained therein is a valve casing 114 having an axial neck 115 into which is screwed a pipe 116 through which air under pressure may be supplied. The valve casing 114 is formed with an interior chamber 117 into which the pipe 116 discharges, and this chamber is closed at one end by a cap plate 118, the valve casing and cap plate being formed with matching flanges 119 and 120, respectively, constituting an annular channel in which is seated a ring 121 provided with packing 122, so that the joint between the ring and the valve casing is sufficiently air tight, the ring being rotatable while the valve casing is fixed against rotation. Extending through and leading from the ring 121 is a circular series of pipes 123, each of which extends to the exterior of the reservoir and there is connected to another pipe 124, which in turn is provided with an upstanding extension 102 carrying a can support 103 and a tube 104, as described with reference to Figs. 8 and 9. The valve casing 114 is formed with a channel 125, so situated that the pipes 123 where passing through the ring 121 are brought successively into communication with the channel 125 in the rotation of the reservoir and of the ring 121. This channel opens freely into the interior of the reservoir, and whenever a pipe 123 is brought into communication with the channel 125, milk may flow from the reservoir into the appropriate pipe. One wall of the chamber 117 of the valve casing is formed with an elongated port in the form of a slot 126 with which the pipes 123 will remain in communication during a large portion of the rotative movement of these pipes, the relation of the pipes 123 to the channel 125 and elongated port 126 being shown in Figs. 11 and 12. Air pressure may be maintained constantly in the pipe 116 and correspondingly in the chamber 117, and whenever a pipe 123 is brought into communication with the chamber 117 through the port 126, this air pressure is brought to bear upon milk within the respective pipes 123 and the milk is forced through the corresponding pipes 124 into the cans then lodged on the supports 103 and the cans are filled in the same manner as described with reference to Figs. 1 to 7. As soon as the end of the port 126 is reached by any particular pipe, the air pressure is cut off therefrom and it is during this period that the full can is removed and an empty can put in its place, and during the passage of a pipe 123 from the terminal end of the port 126 to the beginning of the port 126, the pipe passes by the channel 125 and receives a supply of milk, which, as soon as the filled pipe 123 reaches the beginning of the port 126 in the progress of the rotative movement, is submitted to air pressure, and the milk is forced into the can, as before described. In this form of the invention the discharge ends of the pipes 124 with their continuations 102 are above the level of the milk within the reservoir 113, so that at no time will milk flow spontaneously to the cans or through the discharge ends of the pipe extensions 102.

Figs. 13 and 14 show a somewhat modified form of the valve mechanism of Figs. 10, 11 and 12. In the structure shown in Figs. 13 and 14 there is a rotatable valve casing 127, in which there is formed a circular series of chambers 128 each in communication with a respective pipe 123. Centrally in the valve casing there is formed a conical valve seat 129 through which are ports 130, each port communicating with a respective chamber 128. The conical seat receives a conical valve member 131 connected to the pipe 116 and held stationary thereby with respect to the revolving casing 127. Each chamber 128 has also another port 132, which during the rotative movement of the casing 127 is brought into matching relation with a port 133 in a circular flange 134 formed on the valve 131, this flange 134 covering all the ports 132 except when brought into coincidence with the port 133, the latter opening directly into the reservoir. The valve 131 has an interior chamber 135 in constant communication with the pipe 116, and also has an elongated port 136, like the port 126 of the structure shown in Figs. 10, 11 and 12, and this port 136 communicates successively with the ports 130, being long enough to include several of these ports at one time.

The operation of the structure shown in Figs. 13 and 14 is the same as that described with reference to Figs. 10, 11 and 12, and has the advantage that the conical valve 131 may be made to have a better fit in the valve seat than in the structure shown in Figs. 10, 11 and 12, and packing is unnecessary.

In Fig. 15 there is illustrated a means whereby the inverted cans may be filled with milk under mechanical pressure. All the parts except those directly employed for producing mechanical pressure may be the same as illustrated in Fig. 10, and those parts which agree with the showing of Fig. 10 are given the same reference numerals. The pipes 123 instead of connecting with a valve member, each connect with a pump barrel 137 within the reservoir and within this pump barrel there is located a pump piston 138 carried by a piston rod 139 extending through a head 140 on the upper end of the pump barrel and to a point above the reservoir where the piston rod 139 may be turned at an angle and carry at the end a roller 141 arranged to travel in a channel cam 142 of appropriate shape. The piston rods may pass through guides 143 supported by a frame member 144 carried by a suitable portion of the frame of the machine, which latter may be similar to the frame described with reference to the structure shown in Fig. 1 and associated figures. The pump barrels 137 are provided with ports or passages 145 for the inflow of milk from the reservoir and the structure of the piston may be such as to uncover these passages when the pistons are elevated so as to permit the inflow of milk to the pump barrels and to the pipes 123 at the termination of the upstroke of the pistons. When the pistons are forced downward, these ports are covered and the milk within the pump barrels and pipes 123 is forced to the respective pipes 124 and continuations 102 and ultimately into the cans 65, then assumed to be in position to receive the milk. In other respects the operation is the same as described with reference to the other figures and the description of the operation need not be repeated.

It is an important feature of the present invention that the cans are filled with milk while in the inverted position, that is, with the filling perforation or orifice lowermost. It is also an important feature of the present invention that the air from within the can passes out through a tube which in turn extends through the filling perforation, the milk passing into the can through this perforation in surrounding relation to the air tube. I believe that the filling of the cans while the latter are in the inverted position, and the provision of the air tube whereby air will pass out of the can as the milk or other liquid passes into the can is original with me. By such an arrangement it is possible to greatly expedite the filling of the cans with a liquid such as evaporated milk while wholly eliminating some of the objectionable features incident to the filling of cans with milk by apparatus heretofore proposed both in those cases where the filling orifices are large and where the filling orifices or perforations are of small size.

Many of the claims of this application read upon the structure shown in my aforesaid companion application, and it is intended that the present application shall be the generic one. The said companion application discloses one of the species embraced within the broad invention, and it is to be understood that the claims in this case are in part intended to broadly cover the disclosure of the said companion application, thereby making it unnecessary to incorporate in this application the drawings and description of the disclosure of the companion application in order to define the intended scope of certain of the claims in this case.

The process of canning liquids herein disclosed but not claimed, is described and claimed in my co-pending application Serial No. 669,886, filed on January 6, 1912, for process of canning liquids.

What is claimed is:—

1. In an apparatus for filling liquid into cans through a small perforation in one end of each can, which perforation is of a size to prevent spontaneous outflow of liquid from the can when the latter is inverted, means for temporarily holding the can in an inverted position while being filled, means for directing liquid into the can through the then lower end thereof, and an air duct forming part of the filling apparatus and introducible into and removable from the can through the small filling perforation while the can is inverted and with the perforation remaining open after the air duct is removed therefrom, such air duct being of a diameter sufficiently less than the diameter of the filling perforation to permit the flow of liquid into the can with the air duct within said opening.

2. In an apparatus for filling liquid into cans each of which latter is provided with a single small filling perforation in one end of a size to prevent spontaneous outflow of liquid therefrom when the can is inverted, means for temporarily holding a can in the inverted position while being filled, means for directing liquid into the can through the then lower end thereof, and an air tube related to the can support for introduction into and removal from the can while on the support in the inverted position and with the perforation remaining open after the air duct is removed therefrom, said tube being of a length to extend to a point adjacent to the imperforate end of the can and of a diameter to leave space about it when extending through the perforation in the can for the flow of liquid into said can.

3. In an apparatus for filling liquid into cans, each of the latter having a single small filling perforation of a diameter to prevent spontaneous outflow of liquid therethrough when the can is inverted, a support for temporarily holding the can in the inverted position while being filled, means for directing liquid to said small perforation in the can, sealing means for engaging the perforated head of the can about the perforation to prevent escape of liquid between the can and the liquid directing means, and means forming part of the filling apparatus for the outflow of air from the can, said last named means being introducible into the can through the small perforation prior to the filling operation and removable from the can after the latter has been filled, and means for causing the breaking of the seal about the perforation while the can is still in the inverted position and with the perforation open.

4. In an apparatus for filling liquid into cans through a single small filling perforation in one end of each can and of a size to prevent spontaneous outflow of liquid from the can when inverted, a support for temporarily holding the can in the inverted position while being filled, a material directing means communicating with the small perforation in the can during the filling operation, sealing means between the filling means and the can for preventing flow of liquid except through the filling perforation, means for causing the breaking of the seal at the completion of the filling operation and while the can is still inverted, and with the filling perforation free, and an air tube introducible into the can through the small perforation prior to the filling operation and removable therefrom after the filling operation, the air tube being of a length and diameter to extend into close proximity to the imperforate end of the can when within the same and out of interfering relation with the inflow of liquid through the perforation.

5. In an apparatus for filling liquid into cans through a single small filling perforation in one end of the can and of a diameter to prevent spontaneous outflow of liquid therethrough when the can is inverted, a temporarily active means for sustaining the can in the inverted position during the filling operation, an air tube forming a part of the filling apparatus and extending through the can support, said air tube being introducible into the can prior to the filling operation and removable therefrom subsequent to the completion of the filling operation and of a diameter and length to extend when in the can to a point adjacent the imperforate end thereof without filling the small perforation through which it enters the can, a conduit for material to be filled into the can, and a sealing means between the conduit and the can engaging the latter about the small perforation during the filling operation, the seal between the can and conduit being broken subsequent to the filling operation and while the perforation is unobstructed.

6. In an apparatus for filling liquid into cans through a single small filling perforation in one end of each can of a size to prevent spontaneous outflow of liquid from the can when the latter is inverted, a temporarily active means for sustaining and clamping the can in an inverted position during the filling operation with the imperforate end uppermost, an air tube forming a permanent part of the filling apparatus and extending through the can support, said air tube being introducible into the can prior to the filling operation and removable therefrom subsequent to the completion of the filling operation and of a diameter and length to extend when in the can to a point adjacent the imperforate end thereof without filling the small perforation through which it enters the can, and a conduit for the material to be filled into the can provided at the can engaging end with a sealing means of a size to engage the then lower end of the can about the filling perforation, the supporting means for the can being movable to break the seal and sustain the can in the inverted position with the perforation free.

7. In an apparatus for filling liquid into cans each having a single small filling perforation of a size to prevent spontaneous outflow of liquid from the can when inverted, means for temporarily holding the can in position to receive the liquid, means for conducting liquid to and directing it into the can through the small perforation, and means for the outflow of air from the other end of the can through the filling perforation simultaneously with the inflow of material, said last named means being separable from the filled can while the latter is still inverted and with the perforations remaining open.

8. In an apparatus for filling liquid into cans each with a single small filling perforation at one end of a size to prevent spontaneous outflow of liquid from the can when inverted, a seat for the can for supporting it in an inverted position, clamping means for engaging the other end of the can to hold it to the seat, a liquid conducting means extending to the seat for the can and terminating in filling relation to the perforation in the can when on the seat, an air conduit of a length to enter the can when on the seat to a point adjacent to the imperforate or upper end of the can determined by the level to which the can is to be filled, the filling operation being timed to cause an overflow of the liquid into the air tube, and means for causing the removal of the air conduit from the filled can while the latter is still inverted with the perforation remaining open.

9. In an apparatus for filling liquid into cans through a single small perforation in one end of each can of a size to prevent spontaneous outflow of liquid from the can when inverted, means for temporarily supporting the can in the inverted position with the perforation downward, means for conducting liquid into the can through the small perforation while the can is inverted with the liquid under super-atmospheric pressure at the can, and means constituting a part of the filling apparatus for directing air within the can at the end remote from the perforation through said perforation during the flow of liquid into the can, the air directing means being of materially smaller capacity than the perforation in the can and removable from the filled can while the latter is still inverted and leaving the perforation open.

10. In an apparatus for filling liquid into cans each provided with a single small filling perforation at one end of a size to prevent the spontaneous outflow of liquid therefrom when the can is inverted, a can support adapted to receive a can with the perforated end downward, a liquid conduit extending to the support for directing liquid to the perforation in the can, means for producing super-atmospheric pressure on the liquid where entering the can, an air tube freely open at both ends and of a length to extend into the can to a point adjacent to the imperforate end thereof determined by the desired level to which the liquid is to be filled into the can, said air tube being of a diameter materially less than the diameter of the perforation in the can, and means for the removal of the air tube from the filled can while still inverted and leaving the perforation open.

11. In a can filling apparatus, a rotatable member provided with a distributing chamber, a circular series of can supports adapted to receive cans in the inverted position, each can being provided with a single small filling perforation in one end of a size to prevent spontaneous outflow of liquid from the can when inverted, conduits leading from the distributing chamber each to a respective can support and terminating in position to deliver liquid from the distributing chamber to the filling perforation of an inverted can lodged on the support, and an air tube carried by the support and freely open at the ends, said air tube being of a length to enter a can when on the support through the filling perforation and extend to a point adjacent the imperforate end of the can, of a diameter to leave a filling space between its exterior and the walls of the filling perforation, means for causing the withdrawal of the air tube from the filled can while inverted and leaving the perforation open, and means for supplying liquid to the distributing chamber under super-atmospheric pressure.

12. In a can filling apparatus, a rotatable series of can supports adapted to receive in an inverted position cans each provided at one end with a single small filling perforation of a size to prevent spontaneous outflow of liquid from the inverted can, conduits for liquid leading each to a respective can support and terminating in position to direct liquid to the small filling perforation when the can is in position on the can support, each conduit being provided with a valve, means for actuating each valve to open and close the same at predetermined points in the rotative movement of the can supports, a conduit for the outflow of air from the imperforate end of the can through the filling perforation, said conduit being of materially less diameter than the perforation, and means for directing the liquid to be filled into the cans into the liquid conduits at super-atmospheric pressure.

13. In a can filling apparatus for filling cans with liquid through a single small filling perforation in each can with the cans in an inverted position during the filling operation, said perforation being of a size to prevent spontaneous outflow of liquid from the inverted can, a supporting shaft, means for imparting rotative movement to said shaft, a circular series of can supports carried by the shaft and participating in the rotative movement thereof, can clamping means carried by the shaft and coacting with the can supports to hold the cans in position on said supports, means for actuating the clamping means to release the cans during a part of the rotative movement of the shaft and series of can supports, a distributing chamber carried by the shaft, conduits leading from said distributing chamber and each including a valve, each conduit terminating in position to deliver liquid to the filling perforation of an inverted can when clamped on its support, means for operating the valves to open the same when the cans are in the clamped position, means for closing the valves when the cans are in the unclamped position, an air tube carried by each can support and of materially less diameter than the perforation in a can, said air tube being freely open at both ends and of a length to enter a can when on the support and extend at one end into close proximity to the imperforate end of the can, and the filling operation being timed to cause an overflow of liquid into the air tube, a receptacle for liquid overflowing from the can through the air tube, and means for establishing super-atmospheric pressure on the liquid where entering the cans.

14. In a can filling apparatus for filling cans with liquid through a single small filling perforation in each can of a size to prevent spontaneous outflow of liquid from the can when inverted, said cans being in an inverted position during the filling operation, a supporting shaft, means for imparting rotative movement to said shaft, a circular series of can supports carried by the shaft and participating in the rotative movement thereof, can clamping means carried by the shaft and coacting with the can supports to hold the cans in position on said supports, means for actuating the clamping means to release the cans during a part of the rotative movement of the shaft and series of can supports, a distributing chamber carried by the shaft, conduits leading from said distributing chamber and each including a valve, each conduit terminating in position to deliver milk to the filling perforation in an inverted can when clamped on its support, means for operating the valves to open the same when the cans are in the clamped position, means for closing the valves when the cans are in the unclamped position, an air tube carried by each can support, said air tube being freely open at both ends and of a length to enter a can when on the support and extend at one end into close proximity to the imperforate end of the can, a receptacle for liquid overflowing from the can through the air tube, and means for establishing super-atmospheric pressure on the liquid where entering the cans, said pressure establishing means comprising a liquid reservoir having the level of liquid therein at a height above the discharge ends of the liquid conduits to establish the desired pressure.

15. In a can filling apparatus for filling cans with liquid through a single small filling perforation in each can of a size to prevent spontaneous outflow of liquid from an inverted can, said cans being in an inverted position during the filling operation, a supporting shaft, means for imparting rotative movement to said shaft, a circular series of can supports carried by the shaft and participating in the rotative movement thereof, can clamping means carried by the shaft and coacting with the can supports to hold the cans in position on said supports, means for actuating the clamping means to release the cans during a part of the rotative movement of the shaft and series of can supports, a distributing chamber carried by the shaft, conduits leading from said distributing chamber and each including a valve, each conduit terminating in position to deliver liquid to the filling perforation of an inverted can when clamped on its support, means for operating the valves to open the same when the cans are in the clamped position, means for closing the valves when the cans are in the unclamped position, an air tube carried by each can support, said air tube being freely open at both ends and of a length to enter a can when on the support and extend at one end into close proximity to the imperforate end of the can, a receptacle for liquid overflowing from the can through the air tube, and means for establishing super-atmospheric pressure on the liquid where entering the cans, said pressure establishing means comprising an elevated liquid reservoir and a conduit leading therefrom to and discharging into the valved conduits directing the liquid to the cans.

16. In a can filling apparatus for filling cans with liquid with the cans each provided with a small filling perforation in one end of a size to prevent spontaneous outflow of liquid from an inverted can, a rotatable shaft, means for imparting rotative movement to said shaft, a distributing chamber carried by and participating in the rotative movement of the shaft, an elevated liquid reservoir, a conduit leading from the reservoir to the distributing chamber, liquid conduits branched off from the distributing chamber and each including a valve, a circular series of can supports adapted to receive the cans each in an inverted position with the branched off conduits each communicating with the filling perforation of a respective inverted can when in position on its support, valve operating devices for opening and closing the valves at predetermined intervals in the rotative movement of the rotatable portion of the structure, can clamps one in operative relation to each can support for holding the cans to the supports, means for moving the clamps into and out of operative relation to the cans at predetermined intervals, air tubes on the can supports open at each end and each of a length to enter a can to a point adjacent the imperforate end of a can when in filling position, and a receptacle for liquid overflowing from the cans through the air tubes.

17. In a can filling apparatus, a liquid reservoir, a conduit leading therefrom and provided with a valve, a normally closed inlet to the conduit on the side of the valve remote from the reservoir, a rotatable distributing chamber connected to the conduit at the end thereof remote from the reservoir, distributing conduits branched off from the distributing chamber, can supports at the discharge ends of the distributing conduits and each adapted to receive a can having a single filling perforation at one end with the can in an inverted position when on the support, and an air tube carried by each can support and of a length to enter the can through the filling perforation.

18. In a can filling apparatus for filling cans with liquid where each can is provided with a single small filling perforation at one end of a size to prevent spontaneous outflow of liquid from the inverted filled can, can supports each adapted to receive a can in the inverted position, each support being provided with a sealing member adapted to engage the perforated end of a can in spaced relation to the filling perforation, an air tube carried by the support in position to enter a can when lodged on the sealing member and of a length to approach the imperforate end of the can to a point determined by the desired level of liquid when filled into the can, said tube being of a diameter materially less than the diameter of the perforation in the can, and can receiving and clamping means movable to and from the can support for a distance to clear the can of the air tube in one direction of movement and to cause the insertion of the air tube in the can in the other direction of movement.

19. In a can filling apparatus for filling cans with liquid where each can is provided with a single small filling perforation at one end of a size to prevent spontaneous outflow of liquid from an inverted filled can, can supports each adapted to receive a can in the inverted position, each support being provided with a sealing member adapted to engage the perforated end of a can in spaced relation to the filling perforation, an air tube carried by the support in position to enter a can when lodged on the sealing member and of a length to approach the imperforate end of the can to a point determined by the desired level of liquid when filled into the can, said air tube being of a diameter materially less than the diameter of the filling perforation in a can, and can receiving and clamping means movable to and from the can support for a distance to clear the can of the air tube in one direction of movement and to cause the insertion of the air tube in the can in the other direction of movement, the clamping means being provided with an actuating spring for moving the clamping means into engagement with the can and the latter into engagement with the support, a cam track and clamp controlling means in position to be engaged by the cam track for actuating the clamp in a direction to release the can.

20. In a can filling apparatus for filling liquid into cans each of which is provided with a single small filling perforation at one end of a size to prevent spontaneous outflow of liquid from an inverted filled can, a can support adapted to temporarily receive the can in an inverted position, means for directing the liquid to the can through the small perforation, an air tube adapted to extend through the filling perforation in the can when in the inverted position and lodged on the can support, the air tube being of a length to extend into the can to the desired level of fill, said air tube being freely open at both ends with the end remote from the can when the latter is in position at a lower level than the end introduced into said can and of a diameter to but partially fill the small perforation in the end of the can, and means for causing a relative movement of the filled can and air tube until the air tube is wholly outside the filled can while the latter is still inverted and the perforation is still open.

21. In a can filling machine for filling cans with liquid where each can is provided with a single small filling perforation of a size to prevent spontaneous outflow of liquid from an inverted filled can, an air tube of a size to enter the can through the perforation and but partially fill said perforation and of a length to extend into the can toward the imperforate end to the desired level of fill, a centering can receiving member adapted to receive the can in an inverted position, said can receiving member being associated with the air tube and movable lengthwise thereof to receive the can and guide the latter to move lengthwise of the air tube whereby the said air tube will enter the can through the small filling perforation therein, and means for causing a relative movement of the filled can and air tube until the air tube is wholly outside the filled can while the latter is still inverted and the perforation is still open.

22. In a can filling machine for filling cans with liquid where each can is provided with a single small filling perforation of a size to prevent spontaneous outflow of liquid from an inverted filled can, an air tube of a size to enter the can through the perforation and but partially fill said perforation and of a length to extend into the can toward the imperforate end to the desired level of fill, a centering can receiving member adapted to receive the can in an inverted position, said can receiving member being associated with the air tube and movable lengthwise thereof to receive the can and guide the latter to move lengthwise of the air tube, whereby the said air tube will enter the can through the small filling perforation therein, the can centering member and air tube having associated therewith a liquid directing conduit and a sealing seat for the can in position to receive the can when in the inverted position and when entered by the air tube to the desired extent, the discharge end of the liquid directing conduit being then in operative relation to the filling perforation of the can, and means for causing a relative movement of the filled can and air tube until the air tube is wholly outside the filled can while the latter is still inverted and the perforation is still open.

23. In a can filling apparatus for filling cans with liquid where each can is provided with a single small filling perforation at one end of a size to prevent spontaneous outflow of liquid from an inverted filled can, can supports each adapted to temporarily receive and hold a can in the inverted position with the perforated end downward, each support being provided with a sealing member adapted to engage the outer face of the perforated end of the can in spaced relation to the filling perforation, an air tube carried by the support in position to enter a can when lodged on the sealing member and of a length to approach the imperforate end of the can to a point determined by the desired level to which the liquid is to be filled into the can, and means for causing a relative movement of the filled can and air tube until the air tube is wholly outside the filled can while the latter is still inverted and the perforation is still open.

24. In a can filling apparatus for filling cans with liquid where each can is provided with a single small filling perforation at one end of a size to prevent spontaneous outflow of liquid from an inverted filled can, can supports each adapted to temporarily receive a can in the inverted position and each provided with a sealing member adapted to engage the outer face of the perforated end of the can in spaced relation to the filling perforation, an air tube carried by the support in position to enter a can when lodged on the sealing member in the inverted position and of a length to approach the imperforate end of the can to a point determined by the desired level to which liquid is to be filled into the can, and can receiving and clamping means movable to and from the can support for a distance to clear the can of the air tube in one direction of movement and to cause the insertion of the air tube in the can in the other direction of movement, the clamping means being provided with an actuating spring for moving said clamping means into engagement with the can and the latter into engagement with the support.

25. In a can filling apparatus, an axial supporting member, a rotatable radially arranged supporting member carried by the axial member, and can supports pendently carried by the radial member, each can support having means for receiving a can with a single small filling perforation of a size to prevent spontaneous outflow of liquid from the can when inverted, and each can support also having associated therewith a liquid conduit and an air tube, the apparatus being also provided with means for disconnecting the liquid conduit and air tube from the filled can while still inverted on the support and with the perforation left open.

26. In a can filling apparatus, an axial supporting member, a rotatable radially arranged supporting member carried by the axial member, and can supports pendently carried by the radial member, each can support having means for receiving a can with a single small filling perforation of a size to prevent spontaneous outflow of liquid from the can when inverted, and each can support also having associated therewith a liquid conduit and an air tube, sealing means being provided for connecting the liquid conduit and perforated end of the can when the latter is inverted on the support in air tight relation, and the air tube being of a length and size to enter the can through the small perforation to a point adjacent the imperforate end of the can, the apparatus being also provided with means for disconnecting the liquid conduit and air tube from the filled can while still inverted on the support and with the perforation left open.

27. In a can filling apparatus, a liquid conduit and an air tube in fixed relation one to the other with the air tube projecting beyond the discharge end of the conduit, a support for a can associated with the conduit and air tube to hold the can with a small filling perforation in one end in the inverted position with the tube entering the can through the perforation to a point adjacent the imperforate end thereof, and a clamping head for engaging the end of the can remote from the support, said clamping head having a range of movement to permit the placing of the can on and moving it along the air tube for the full length of the projection of the air tube beyond the conduit.

28. In a can filling apparatus, the combination with a can support having an air tube associated therewith of a length to enter a can when on the support to a point adjacent the end remote from the support, of a clamping head adapted to engage the end of a can remote from that engaging the support, said clamping head having a range of movement greater than that of the length of the can to be clamped and having a normal tendency toward the clamping position.

29. In a machine for filling cans each of which is provided with a small filling perforation in one end, a rotatable series of supports for the cans to be filled and adapted to sustain the cans in the inverted position with the small filling perforation downward, a liquid directing conduit associated with each support and having at its discharge end means for forming an air tight seal with the perforated head of the can about the perforation, an air tube in normally fixed relation to the liquid conduit and projecting beyond the discharge end of the conduit to an extent to enter a can to the filling level thereof when the can is in sealed relation to the conduit, a clamp member in operative relation to each can support to clamp a can thereto, said clamp member having a range of travel greater than the length of the can to be clamped and also having a normal tendency toward the clamping position, and means for moving the clamp head against its normal tendency during a predetermined portion of the rotative movement of the series of supports.

30. In a machine for filling cans each of which is provided with a small filling perforation in one end, a rotatable series of supports for the cans to be filled and adapted to sustain the cans in the inverted position with the small filling perforation downward, a liquid directing conduit associated with each support and having at its discharge end means for forming an air tight seal with the perforated head of the can about the perforation, an air tube in normally fixed relation to the liquid conduit and projecting beyond the discharge end of the conduit to an extent to enter a can to the filling level thereof when the can is in sealed relation to the conduit, a clamp member for and having a range of movement toward and from each can support greater than the length of a can to be clamped, a spring for each of said clamp members tending normally to move the clamp member toward the can support, a lever for each clamp member acting in opposition to the spring therefor, and a cam track shaped to actuate the lever to compress the spring and thereby move the clamp member against its normal tendency during a predetermined portion of the rotative movement of the series of can supports.

31. In a can filling apparatus, a relatively fixed conduit for liquid having sealing means at its discharge end, a relatively fixed air tube projecting beyond the discharge end of the conduit, a can support movable toward and from the discharge end of the conduit and having a normal tendency away from said conduit, and means for moving a can placed on the support together with said support in a direction toward the conduit until in sealing relation with said conduit and the air tube is within the can to approximately the filling level, each can being provided with the small filling perforation in the end to be placed upon the can support.

32. In a can filling apparatus, a relatively fixed conduit for liquid having sealing means at its discharge end, a relatively fixed air tube projecting beyond the discharge end of the conduit, a can support movable toward and from the discharge end of the conduit and having a normal tendency away from said conduit, and means for moving a can placed on the support together with said support in a direction toward the conduit until in sealing relation with said conduit and the air tube is within the can to approximately the filling level, each can being provided with the small filling perforation in the end to be placed upon the can support, and the means for imparting a normal tendency of movement in one direction to the can support comprising supporting rods carrying the can support with springs on said rods and guiding members through which the rods move.

In testimony, that I claim the foregoing as my own, I have hereto affixed my signature in the presence of two witnesses.

WALTER J. PHELPS.

Witnesses:
    JOHN H. SIGGERS,
    DAVID R. WAGNER.